United States Patent [19]

Kennedy

[11] Patent Number: 4,924,985
[45] Date of Patent: May 15, 1990

[54] DUAL FACE WIPER FOR A VISCOUS FLUID CLUTCH

[75] Inventor: Lawrence C. Kennedy, Kettering, Ohio

[73] Assignee: General Motors Corporation, Detroit, Mich.

[21] Appl. No.: 355,536

[22] Filed: May 22, 1989

[51] Int. Cl.⁵ .............................................. F16D 31/00
[52] U.S. Cl. ................................. 192/58 B; 192/82 T
[58] Field of Search ........................... 192/82 T, 58 B; 123/41.12

[56] References Cited

U.S. PATENT DOCUMENTS

| 4,086,989 | 5/1978 | Spence | 192/58 B |
| 4,271,946 | 6/1981 | Bridge | 192/58 B |
| 4,405,039 | 9/1983 | Hauser | 192/82 T |
| 4,564,093 | 1/1986 | Storz | 192/58 B |
| 4,564,094 | 1/1986 | Storz | 192/58 B |
| 4,592,456 | 6/1986 | Neugebauer | 192/58 B |

Primary Examiner—Allan D. Herrmann
Assistant Examiner—Nicholas Whitelaw
Attorney, Agent, or Firm—A. Michael Tucker

[57] ABSTRACT

A fan clutch assembly for a vehicle includes a pump plate for separating a collecting chamber and a receiving chamber from a reservoir. The pump plate includes a plurality of orifices for permitting the passage of fluid from the receiving chamber to the reservoir. A dual face wiper having scoop surfaces on each lateral side is mounted on the pump plate adjacent respective orifices to permit either clockwise or counterclockwise rotation of the fan asssembly.

3 Claims, 2 Drawing Sheets

DUAL FACE WIPER FOR A VISCOUS FLUID CLUTCH

BACKGROUND OF THE INVENTION

1. Field of the Invention

The present invention relates generally to a viscous fluid coupling device. In particular, the present invention is concerned with a dual face wiper of a viscous fluid fan clutch for a vehicle.

2. Statement of the Related Art

A thermostatically-controlled viscous fluid clutch assembly for driving and rotating a vehicle cooling fan is well-known. A multi-bladed fan is removably secured to a body of the clutch assembly. The fan and clutch assembly are Installed between an accessory pulley of a vehicle engine (typically the water pump pulley) and a radiator. The clutch assembly drives the fan at high speeds close to input speed when cooling is required and permits the fan to rotate at low speeds when cooling is not required. Thermostatic control of the fan through the clutch assembly reduces the load on an engine and the noise caused by fan rotation, resulting in horsepower gain and improved fuel economy.

Generally, a clutch plate, housed within the clutch assembly, having lands and grooves is mated to the body having complementary lands and grooves. A pump plate separates a pair of internally-contained chambers, a receiving chamber and a collecting chamber, from a reservoir. Gates in the pump plate permit selective flow of a viscous fluid from the reservoir to the receiving chamber and Into a shear zone between the lands and grooves of the body and clutch plate. Fluid shear in the lands and grooves transfers input torque from the clutch plate to drive the body and the attached fan.

When cooling is not required, gates in the pump plate are closed and the fluid in the shear zone is pumped into the receiving chamber. Orifices in the pump plate permit passage of the fluid from the receiving chamber into the reservoir. The removal of a majority of the fluid from the shear zone substantially reduces the shear between the clutch plate and the body, thereby substantially reducing the rotation of the fan.

It is well-known to provide wiper elements on a surface of the pump plate in communication with the receiving chamber. A wiper, which can be formed as a thin, flat element, is secured to the pump plate (usually by welding) adjacent each pump plate orifice. In other embodiments, a wiper may be formed by stamping a cylindrical projection in a pump plate. As the wiper encounters fluid in the receiving chamber, an increase in fluid pressure occurs as the wiper creates a fluid dam. The increase in fluid pressure results in increased fluid flow through a pump plate orifice.

To further enhance the pumping ability of a wiper, it is well-known to provide a "scoop" and surface on a wiper. A scoop end surface is a curved surface of the wiper positioned adjacent a pump plate orifice. The curved surface includes an inlet or "bay" portion which receives oncoming fluid in the collecting chamber and creates a fluid dam.

In conventional fan clutches, the wiper must be secured to the pump plate so that the scoop surface encounters oncoming fluid. If a wiper is improperly positioned on the pump plate so that the scoop surface does not encounter oncoming fluid, then the advantages of the scoop surface will not be realized.

Fan clutches are designed to be rotated in either a clockwise or counterclockwise direction, depending upon the application. A critical aspect of conventional fan clutch assembly includes the inclusion of a pump plate having a wiper scoop surface oriented for the proper direction. Separate pump plate inventories are maintained for clockwise and counterclockwise clutch assemblies. Careful attention is employed to ensure that the proper pump plate is assembled with the respective assembly.

The art continues to seek improvements. It is desirable that a viscous fluid clutch assembly provide thermostatic operation of a fan when cooling is required. Furthermore, it is desirable that a clutch assembly be capable of either clockwise or counterclockwise rotation, depending upon the requirements of the application.

SUMMARY OF THE INVENTION

The present invention includes a viscous fluid drive device particularly adaptable for a fan clutch assembly of a vehicle. The present fan clutch assembly utilizes a pump plate having a dual face wiper to permit either clockwise or counterclockwise rotation of the clutch assembly. The dual face wiper is economical to manufacture and assemble and can be incorporated in convention clutch assemblies.

The present invention includes a fan clutch assembly for a vehicle. The clutch assembly includes a pump plate for separating a collecting chamber and a receiving chamber from a reservoir. The pump plate includes a plurality of orifices for permitting the passage of fluid from the receiving chamber to the reservoir. A dual face wiper having scoop surfaces on each lateral side is mounted on the pump plate adjacent respective orifices to permit either clockwise or counterclockwise rotation of the fan assembly.

DETAILED DESCRIPTION OF THE PREFERRED EMBODIMENTS

Figure 1:
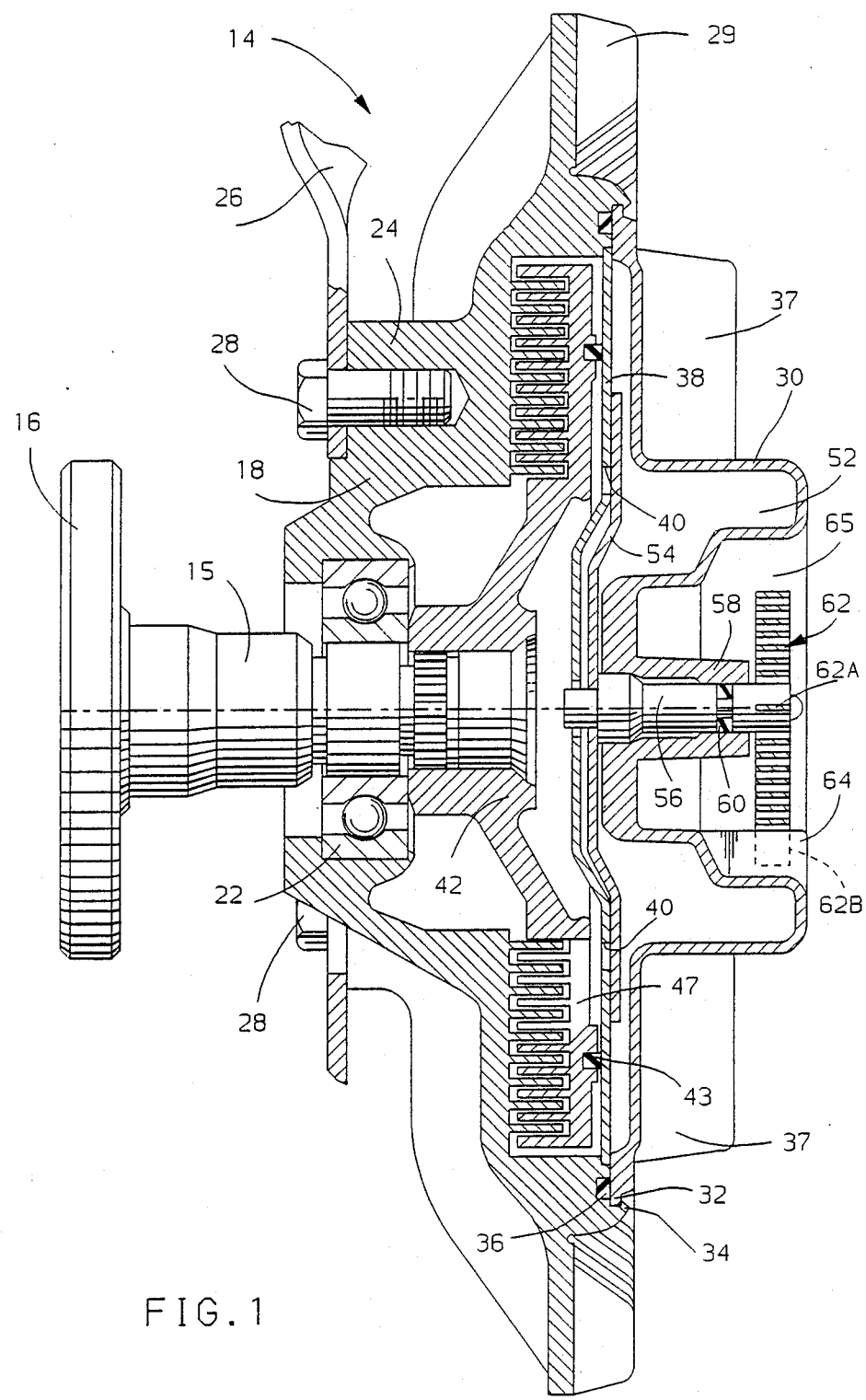
FIG. 1 is a sectional view of a viscous fluid fan clutch and blade assembly incorporating a pump plate assembly present invention.

FIG. 1 illustrates a multi-bladed fan and clutch assembly, indicated generally at 14, for drawing cooling air through the core of a vehicle radiator (not illustrated) through which engine cooling fluid is circulated. The fan and clutch assembly 14 is mounted on the outboard end o f a rotatably driven shaft 15 whose inboard end terminates in a flange 16 which can be secured to a conventional engine-driven water pump pulley (not illustrated). The fan and clutch assembly 14 includes a dished main body 18 centrally mounted for rotation on shaft 15 by a bearing 22. The main body 18 is formed with a plurality of radially extending bosses 24 to which a multi-bladed fan 26 (partially illustrated in FIG. 1) is attached by threaded fasteners 28. A plurality of fins 29 is provided on the outer surface of the main body 18 to dissipate heat transferred from a viscous fluid housed bY the assembly 14.

A cover plate 30 is mounted to a front face of and cooperates with the main body 18 to form a housing and reservoir as described below. The cover plate 30 is a dished member whose annular outer edge 32 is secured to the main body 18 by an annular retainer lip 34 spun over from the material of the main body 18. An annular seal 36, e.g., a formed-in-place gasket, is interposed between the edge 32 and the front face of the main body 18 to prevent leakage of the fluid from the interior of the assembly 14. A plurality of fins 37 is provided on the outer surface of the cover plate 30 to dissipate heat transferred from the fluid.

Disposed behind the cover plate 30 is a disk-like annular pump plate 38 whose diameter is slightly less than that of the cover plate 30. The pump plate 38 is drivingly secured to the main body 18 as it is trapped on an annular shoulder 39 (FIG. 2) on the main body 18 by the cover plate 30.

The pump plate 38 has a pair of diametrically opposed passages or gates 40 provided in its central portion. When opened, gates 40 allow the fluid to flow into a collecting chamber 41 (illustrated best in FIG. 2) formed and bounded by the pump plate 38, a clutch plate 42 and a divider ring 43. The clutch plate 42 is splined on shaft 15 at a central opening and provides for the hydraulic drive of the main body 18 and attached fan 26 as described below. Ring 43, preferably formed from TEFLON, is mounted in an annular groove 43A in the outer or front face of the clutch plate 42 and improves pump-out or clutch disengagement as described below. A divider ring of this type is described in U.S. Pat. No. 4,741,421, issued May 3, 1988, assigned to the assignee of this invention and hereby incorporated by reference.

Figure 2:
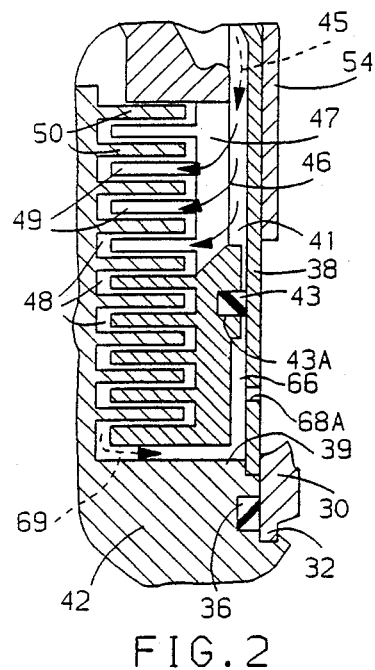
FIG. 2 is an enlarged view of a portion of the clutch assembly of FIG. 1 wherein the pump plate has been rotated and parts removed therefrom to illustrate fluid flow from a receiving chamber through a pump plate orifice.

As illustrated in FIG. 2, the centrifugal forces of the rotating assembly 14 force the axial fluid flow through gate 40 to radial fluid flow as indicated bY directional arrows 45 into the collecting chamber 41.

Axial flow fluid, as indicated by directional arrows 46, is forced through well-known passages 47 in the clutch plate 42 into an annular serpentine fluid shear zone 48 formed by the grooves or spaces between interleaved concentric annular ridges or lands 49 formed in a rear face of a clutch plate 42 and complementary concentric annular ridges or lands 50 formed on an interior surface of the main body 18.

Fluid sheared in the shear zone 48 transmits input torque from the rotatably driven clutch plate 42, centrally splined on shaft 15, to provide for the hydraulic drive of main body 18 and the attached bladed fan 26 for cooling fan operation. Due to slippage between the clutch plate 42 and the main body 18, the fan speed is always less than the input speed from the shaft 15.

A reservoir 52 formed between the cover plate 30 and the pump plate 38 contains a specified quantity of viscous fluid. The opening and closing of the gates 40 to control the supply of the fluid into the collecting chamber 41 is provided by a valve plate 54 0 that extends from driving connection with a center shaft 56 rotatably mounted in a tubular hub portion 58 formed in the central portion of the cover plate 30. An 0-ring seal 60 is mounted in an annular groove in the center shaft 56 and makes peripheral contact with the inner wall of the hub portion 58 to prevent fluid leakage to the exterior of the assembly 14.

A helically-wound bimetallic thermostatic valve control element 62 includes an inner end portion 62A mounted in a transverse slot formed in a forward end of the center shaft 56 and an outer end portion 62B mounted in a retaining tab 64 formed in the cover plate 30. Preferably, valve control element 62 is recessed within a cavity 65 surrounding the hub portion 58. Through this construction, an increase or decrease in ambient air temperature causes the winding or unwinding of the valve control element 62, resulting in rotation of the center shaft 56 and the attached valve plate 54. The actuation of valve plate 54 to control the opening and closing of gates 40 is well-known and described in U.S. Pat. No. 4,741,421 and hereby incorporated by reference.

In FIG. 2, fluid indicated by directional arrow 69A, is forced radially outwardly by centrifugal forces and exits the shear zone 48 into a receiving chamber 66 formed and bounded by the pump plate 38, the clutch plate 42 and the divider ring 43. Fluid, indicated by directional arrow 69B, in the receiving chamber 66 is returned to the reservoir 52 through a plurality of orifices 68 provided in a portion of the pump plate in communication with the receiving chamber 66. The return of fluid from the receiving chamber 66 to the reservoir 52 is well-known and described in U.S. Pat. No, 4,741,421 and hereby incorporated by reference.

Figure 3:
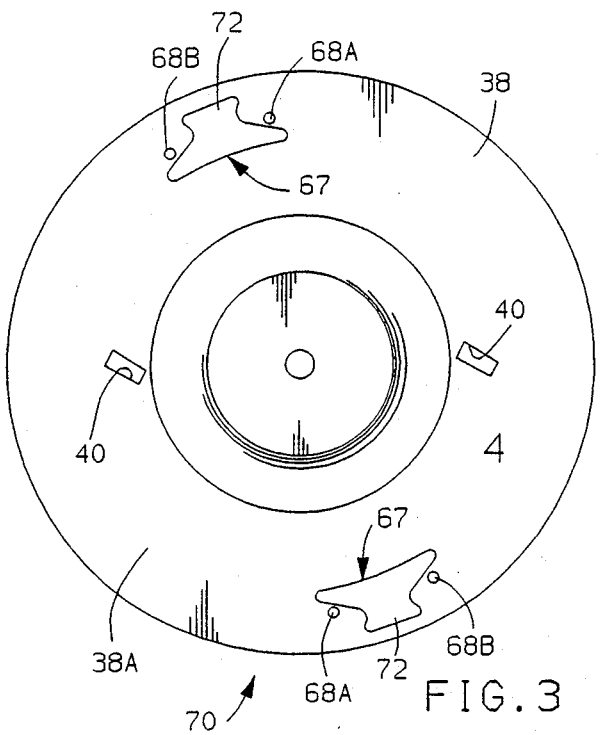
FIG. 3 is a top plan view of a first embodiment of the present pump plate assembly removed from the clutch assembly of FIG. 1 and illustrating a first embodiment of dual face wipers mounted adjacent respective orifices.
Figure 4:
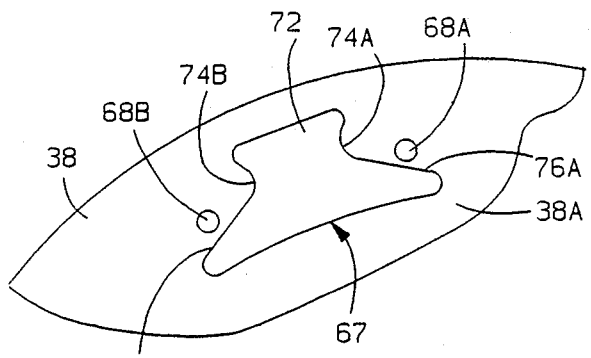
FIG. 4 is an enlarged, partial top plan view of the pump plate of FIG. 3 detailing the first embodiment of the dual face wiper.

In a first preferred embodiment illustrated best in FIGS. 3 and 4, a pump plate assembly, indicated generally at 70, includes a pair of dual face wiper elements 67 secured on a rear surface 38A, i.e., the surface in communication with the receiving chamber 66, of the pump plate 38 outbound of the divider ring 43. For balance, it is preferred that the wipers 67 are diametrically opposed from each other. In other embodiments of pump plate assembly 70, a plurality of wipers 67 can be provided on the pump plate 38.

Wipers 67 can be formed by any suitable means, e.g., as thin, flat metallic or plastic members. Each wiper includes a central body portion 72 and a pair of opposite curved scoop surfaces 74A and 74B. Preferably, each scoop surface 74A or 74B includes an inlet or bay 76A and 76B, respectively, for receiving oncoming fluid and forces a fluid dam in a well-known manner.

Adjacent each scoop surface 74A and 74B, an orifice 68A and 68B, respectively, is provided in the pump plate 38 Orifices 68A and 68B can be formed by stamping or any other suitable means.

Figure 5:
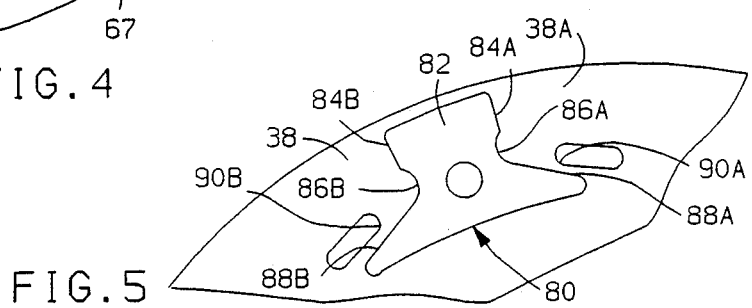
FIG. 5 is an enlarged, partial top plan view of a second embodiment of the present dual face wiper mounted on the pump plate.

A second preferred embodiment of the present dual face wiper is indicated generally at 80 in FIG. 5. Wiper 80 is secured on the rear surface 38A of pump plate 38 by any suitable means, e.g. welding. Wiper 80 includes a central body portion 82 having a pair of dam surfaces 84A and 84B, a pair of bays 86A and 86B and a pair of scoop surfaces 88A and 88B. Bays 86A and 86B and scoop surfaces 88A and 88B operate in a similar manner to corresponding elements in wiper 67. Dam surfaces 84A and 84B provide additional surfaces for encountering oncoming fluid flow, thereby increasing fluid pressure in the receiving chamber 66. Slot-like orifices 90A and 90B are provided adjacent respective scoop surfaces 88A and 88B.

In use, the pump plate assembly 70 is installed in the clutch assembly 14 as described above. When the pump plate 38 illustrated in FIGS. 3 and 4, is rotated in a clockwise direction, scoop surface 76A and bay 74A encounter fluid, create a pressure dam and pump fluid through orifice 68A. When the pump plate 38 illustrated in FIGS. 3 and 4 is rotated in counterclockwise direction, scoop surface 76B and bay 74B encounter fluid, create a pressure dam and pump fluid through orifice 68B. Wiper 80 illustrated in FIG. 5 functions in a similar manner to wiper 67.

The present dual face wipers 67 and 80 can be mounted on a pump plate 38 in a conventional clutch assembly 14 to permit either the clockwise or counterclockwise rotation of the assembly 14. The design of scoop surfaces 76A, 76B and 88A, 88B and the configuration and placement of orifices 68A, 68B and 90A, 90B can be modified to create a desired pump-out of the receiving chamber 66.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A pump plate assembly for separating a receiving chamber and a reservoir of a viscous fluid clutch, wherein the receiving chamber receives fluid from a shear zone, the pump plate comprising:
   (a) a plate member having a front surface in communication with the reservoir and a rear surface in communication with the receiving chamber;
   (b) at least one pair of first and second laterally-spaced openings provided in the plate member at approximately the same radial position for permitting the passage of fluid from the receiving chamber to the reservoir; and
   (c) a planar member having a central body and a pair of opposite scoop surfaces fixedly mounted on the pump plate rear surface in-between the first and second openings for pumping the fluid in the receiving chamber through either the first or second opening depending upon the rotational direction of the plate member.

2. The pump plate assembly as specified in claim 1 wherein the planar member includes a bay provided at each scoop surface.

3. The pump plate assembly as specified in claim 2 wherein the planar member includes a dam surface provided adjacent each bay.

* * * * *